United States Patent [19]

Labun

[11] Patent Number: 5,710,712
[45] Date of Patent: Jan. 20, 1998

[54] PROCESSOR SYSTEM AND METHOD FOR APPLIANCES

[75] Inventor: Nicholas Mikulas Labun, Chicago, Ill.

[73] Assignee: Motorola, Inc., Schaumburg, Ill.

[21] Appl. No.: 343,314

[22] Filed: Nov. 22, 1994

[51] Int. Cl.[6] .................................................. G05B 13/02
[52] U.S. Cl. ........................ 364/492; 364/139; 307/31; 307/39; 340/825.06
[58] Field of Search ..................... 364/492, 550, 364/551.01, 132, 138, 139, 140, 141, 146; 307/39, 40, 31; 340/825.06, 310.01

[56] References Cited

U.S. PATENT DOCUMENTS

| 4,174,517 | 11/1979 | Mandel | 340/310.02 |
|---|---|---|---|
| 4,200,862 | 4/1980 | Campbell et al. | 340/310.01 |
| 4,418,333 | 11/1983 | Schwarzbach et al. | 340/310.01 |
| 4,899,129 | 2/1990 | MacFadyen et al. | 340/310.01 |
| 4,899,217 | 2/1990 | MacFadyen et al. | 348/8 |
| 5,109,222 | 4/1992 | Welty | 340/825.72 |
| 5,113,294 | 5/1992 | Kim | 360/33.1 |
| 5,218,552 | 6/1993 | Stirk et al. | 364/492 |
| 5,233,342 | 8/1993 | Yashiro et al. | 340/825.06 |
| 5,321,846 | 6/1994 | Yokota et al. | 455/4.2 |

OTHER PUBLICATIONS

Gilmore, V., "The Integrated, Automated, Educated House," *Popular Science*, Jun. 1990, pp. 104–107.

"Control Networks for the Home," *Machine Design*, Oct. 20, 1983, pp. 109–112.

"Centralizing Security, Communication and Control Brings Home Control Closer to Reality," *JEI*, May 17, 1984.

Wright, M., "Low–Cost Control LANs Add Automation to Homes, Autos, and Offices," *EDN*, Jul. 20, 1992, pp.183–188.

*Primary Examiner*—Emanuel T. Voeltz
*Assistant Examiner*—Kyle J. Choi
*Attorney, Agent, or Firm*—Bruce E. Stuckman; Michael K. Lindsey

[57] ABSTRACT

A processor system provides electrical power and processing to a plurality of appliances. A data bus receives a control input signal from each of the plurality of appliances and transfers electrical power and output command signals to each of the plurality of appliances. A processor, coupled to the data bus, generates an output command signal for each of the plurality of appliances in response to the input control signals.

24 Claims, 4 Drawing Sheets

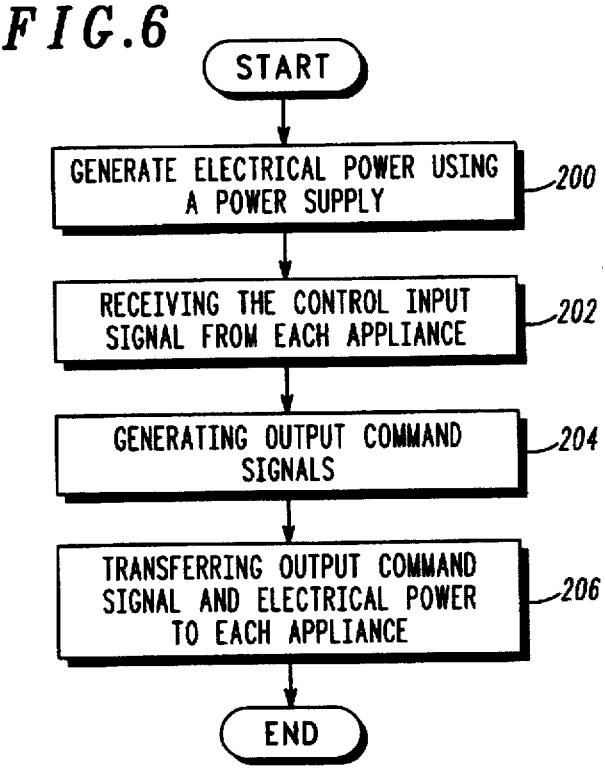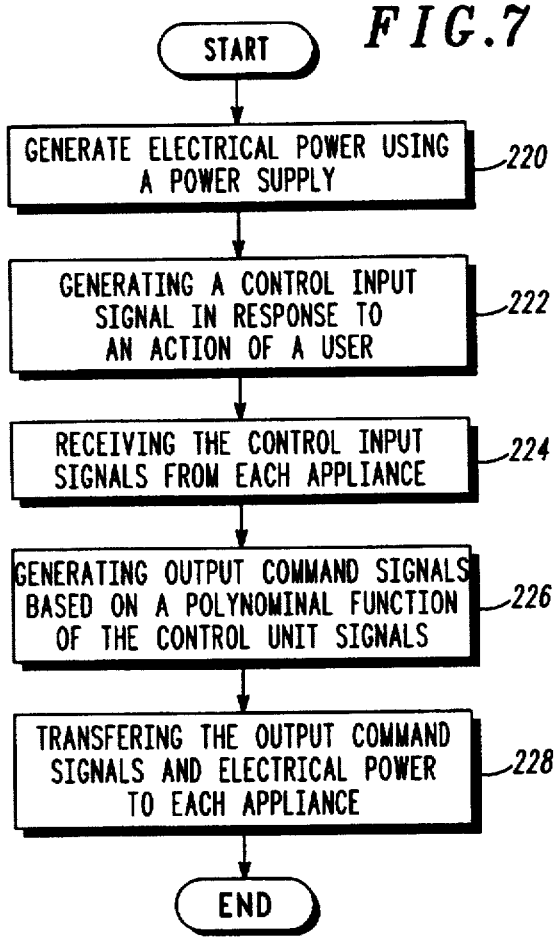

PROCESSOR SYSTEM AND METHOD FOR APPLIANCES

CROSS REFERENCE TO RELATED INVENTION

The present invention is related to the following invention which is assigned to the same assignee, Motorola, Inc., as the present invention:

Neural Network and Method of Using Same, having Ser. No. 08/076,601, filed on Jun. 14, 1993.

The subject matter of the above-identified application is hereby incorporated by reference into the disclosure of this invention.

FIELD OF THE INVENTION

The present invention relates to appliances and, in particular, to processors used in appliances.

BACKGROUND OF THE INVENTION

One's home is currently filled with many appliances which are "smart". FIG. 1 shows a block diagram of the essential components of a typical prior art appliance. Examples of smart appliances include computers, television sets, VCRs, washing machines, dryers, refrigerators, dishwashers, coffee makers, vacuum cleaners, etc. Each smart appliance 10 contains one or more processors 16 as well as some form of input unit 12 and output unit 14 for performing the functions for which they were designed. For instance, the components and functions of a television set can be broken down as shown in Table I.

TABLE I

Input Units:
* * RF signal input;
* * User control inputs (volume, brightness, channel, etc.);

Output Units:
* * Speakers and amplifiers;
* * Picture tube;

Functions Performed by the Processor:
* * Demodulation and tuning;
* * Picture quality control;
* * Control based on control inputs;
* * Etc.;

It should be noted that the processors are, in general, operating extremely inefficiently. At any given time, most of these processors are either switched off or waiting for further input. These processors are performing real functions only a small percentage of the time.

A further problem with many smart devices found in the home is that they each require a power supply 18 which converts the 120 VAC power supplied to the house into the low voltage DC power required to operate. These power supplies are heavy and bulky and add substantial cost to these devices.

BRIEF DESCRIPTION OF THE DRAWINGS

The invention is pointed out with particularity in the appended claims. However, other features of the invention will become more apparent and the invention will be best understood by referring to the following detailed description in conjunction with the accompanying drawings in which:

FIG. 6 presents a flowchart representation of a method of operating the plurality of appliances in accordance with one embodiment of the present invention.

FIG. 7 presents a flowchart representation of a method of operating the plurality of appliances in accordance with an alternative embodiment of the present invention.

DETAILED DESCRIPTION OF A PREFERRED EMBODIMENT

The present invention provides a central processor for providing processing power for distribution to a series of "dumb" appliances via a processing bus. The resulting appliances are thus less expensive than their "smart" counterparts. Further, the connection to a common bus allows interaction between devices to be easily effectuated through a central processor.

Figure 1:
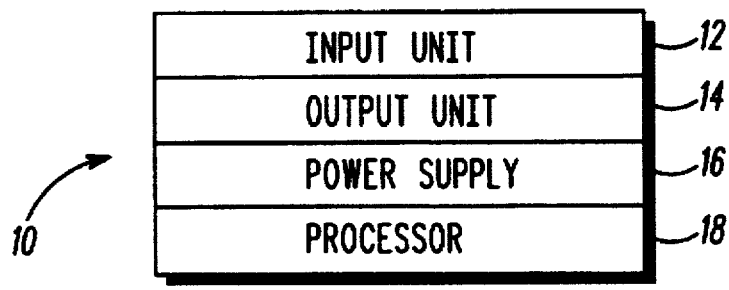
FIG. 1 shows a block diagram of the essential components of a typical prior art appliance.
Figure 2:
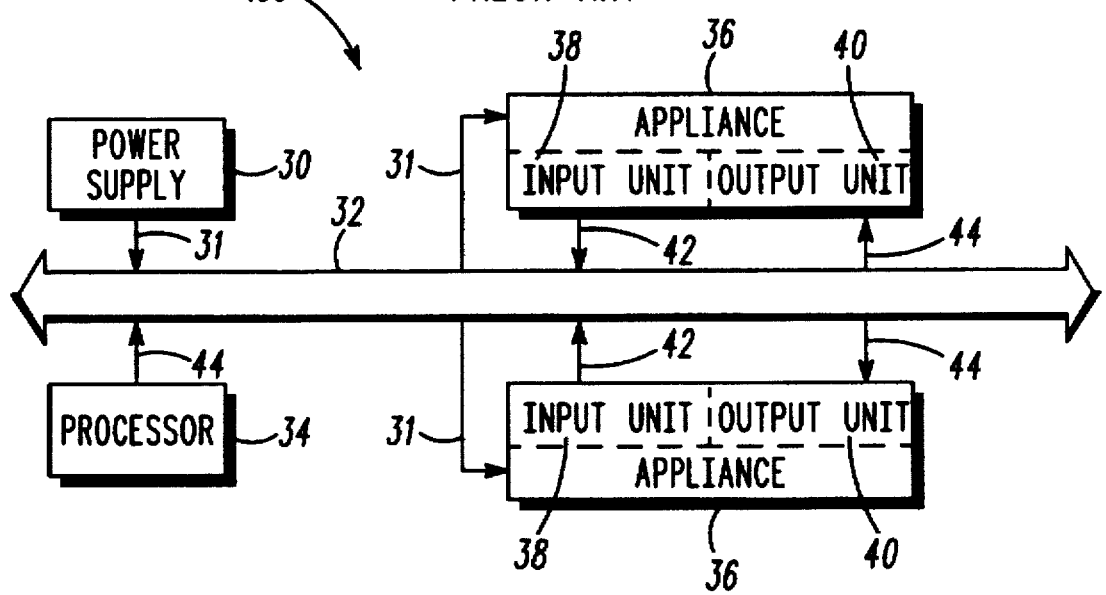
FIG. 2 shows a block diagram of one embodiment of the system of the present invention.

FIG. 2 shows a block diagram of one embodiment of the system of the present invention. The present invention provides a processor system 100 for a plurality of appliances 36. Each of the plurality of appliances 36 has an input unit 38 which generates at least one control input signal 42 and an output unit 40 responsive to at least one output command signal 44.

A power supply 30 is provided for supplying electrical power over conductor 31. A data bus 32 coupled to the plurality of appliances 36 and the power supply 30 is also provided for receiving the control input signal 42 from each of the plurality of appliances 36, and for transferring electrical power over conductor 31 and output command signals 44 to each of the plurality of appliances 36. A processor 34, coupled to the data bus 32 and responsive to the received control input signals 42, is provided for generating the output command signal 44 for each of the plurality of appliances.

In one embodiment of the present invention, the electrical power over conductor 31 supplied by power supply 30 includes a low voltage direct current of in the range of 12 to 24 volts. However, one skilled in the art will recognize that other ranges or forms of electrical power, such as 112 VAC or 220 VAC etc. could also be used.

Figure 3:
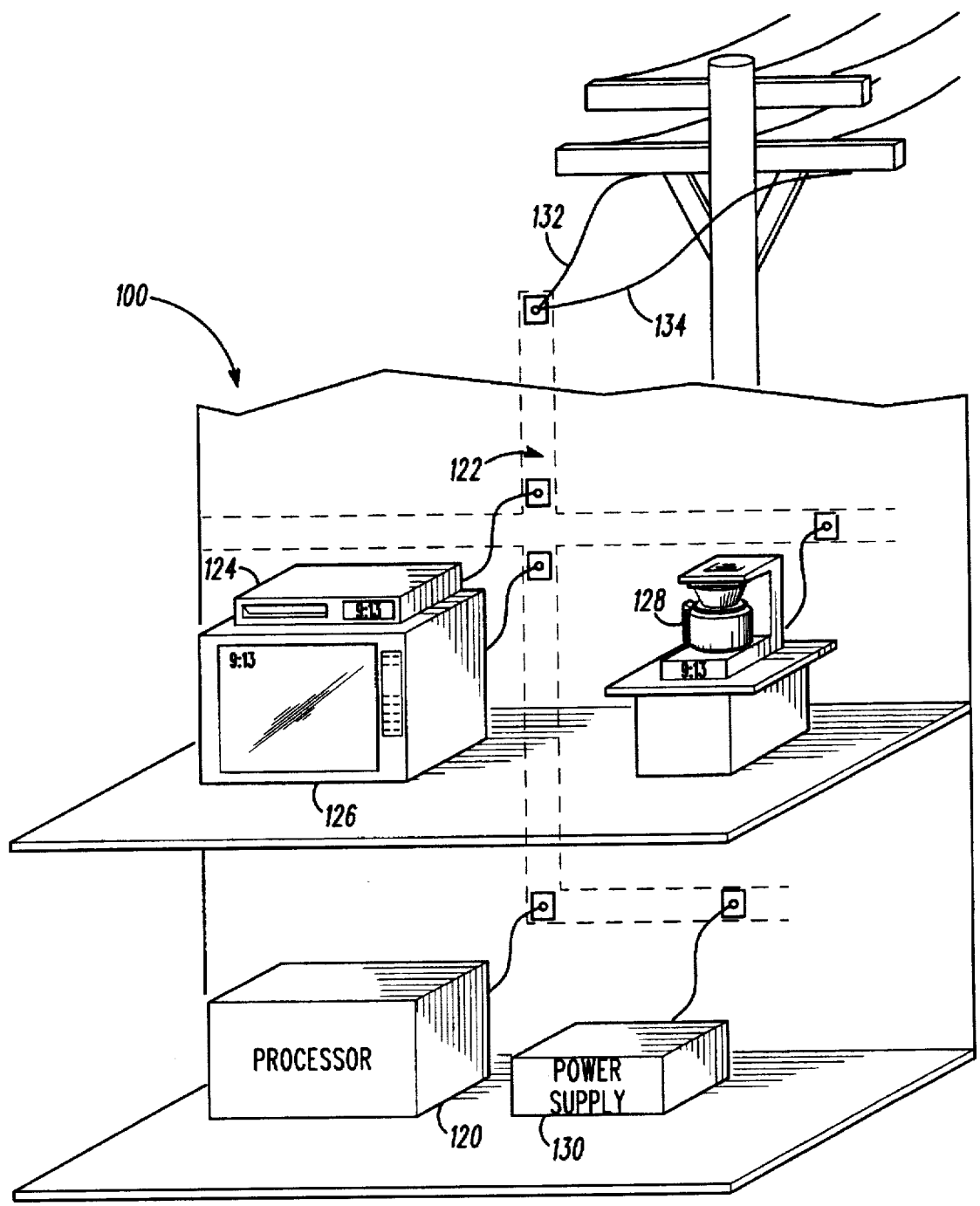
FIG. 3 shows an example of the processor system of a further embodiment of the present invention installed in a building such as a house.

FIG. 3 shows an example of the processor system of a further embodiment of the present invention installed in a building such as a house. Processing system 100 includes processor 120 connected to data bus 122. This data bus 122 is incorporated into the walls of the house in a similar fashion to traditional home wiring for telephone, power, cable television, etc. "Dumb" appliances are shown, such as VCR 124, television 126 and coffee maker 128. Further, cable television line 132 and telephone line 134 are also connected to the data bus 122.

Power supply 130 is further connected to data bus 122 in order to supply power to "dumb" appliances 124, 126 and 128.

In one embodiment of the present invention, this data bus 122 is implemented using a coaxial cable of other transmission line. In this fashion, homes with existing transmission lines installed, such as cable television lines can be modified to operate with the present invention without the provision of additional wiring.

In one embodiment of the present invention, this power supply 130 supplies 16 volts DC to "dumb" appliances 124, 126 and 128 for regulation down to 12 or 5 volts as required by or at the individual units.

An example of the operation of processing system 100 can be described in terms of television 126. This television 126 contains input units to receive cable television signals supplied by data bus 122, a picture tube for providing a visual display, and speakers for providing an audio output. This television could also contain buttons for indicating various user control inputs (volume, brightness, channel, etc.); however, a common bus remote control (not shown), which supplies information to the bus, could also be used to control the operation of television 126. The processing functions which would normally be resident within the television 126 are performed by processor 120. Thus, much of the circuitry, which one would normally expect, would not be needed. When a user indicates a change of channel is desired by pressing a button on the television 126 or by means of a speech recognizer used in conjunction with television 126, a television remote control or bus remote control, a control input signal, such as a digital voltage signal, is generated. This control input signal is transferred to the processor 120.

In one embodiment of the present invention, the processor 120, in turn, generates an appropriate output command signal, such as a digital signal, to television 126 to command the television 126 change the channel.

In an alternative embodiment of the present invention, the processor 120 itself includes a tuner and selects the new channel. In this alternative embodiment, the composite video signal corresponding to the new channel is selected via processor 120 and is routed to television 126 via bus 122. Further, some of the power to the unit, the necessary low-voltage DC power, would also be supplied by data bus 122 from power supply 130.

Further, the programming of the appliances could be performed via the processor 120. In this fashion, the time/date clocks of each device could be programmed simultaneously and the coordinated operation of different devices could be effectuated.

Figure 4:
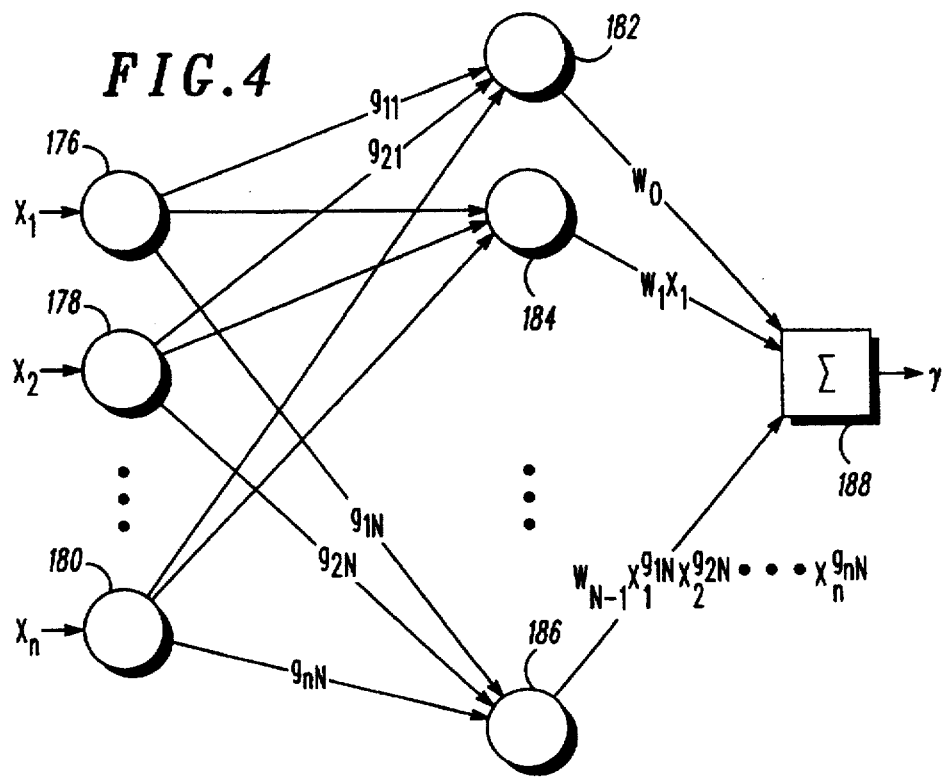
FIG. 4 shows a schematic representation of the processor used in one embodiment of the present invention.

FIG. 4 shows a schematic representation of the processor used in a preferred embodiment of the present invention. This processor 34 calculates output command signals as a polynomial function of one or more control input signals. A plurality of control input signals, $x_1, x_2, \ldots, x_n$ are fed to input nodes 176, 178, 180 of an input layer. The output of each input node 176, 178, 180 in the input layer is distributed at least one processing element of a hidden layer (of which only processing elements 182, 184, 186 are shown). Each processing element applies a gating function to each of the control inputs to produce a corresponding gated input. Any given processing element may apply a different gating function to each different control input it receives. For example, processing element 182 applies a gating function ($g_{11}$) to the control input it receives from input node 176; it applies a gating function ($g_{21}$) to the control input it receives from input node 78; and so forth. The gated inputs are multiplied together by a multiplier in the processing element to form a product, which is then multiplied by a control coefficient $w_{i-1}$ to form the ith term of the polynomial. The ith term of the polynomial is added to the other, similarly calculated, terms by summer 188 to produce the control output y.

For example, in FIG. 4 processing element 182, which happens to be responsible for generating the first polynomial term, multiplies its gated inputs together to form a product (which happens to be one because in this case the gating functions $g_{11}, g_{21}, \ldots g_{n1}$ are all 0), which is multiplied by a control coefficient $w_o$ to produce a corresponding output $w_o$. Processing element 184, which happens to be responsible for generating the $w_1 \, x_1$ term of the polynomial, multiplies its gated inputs together to form a product (which happens to be $x_1$ because in this case the gated functions are all 0 except for the gating function that is applied to the $x_1$ output of the input node 176), which is multiplied by a control coefficient $w_1$ to produce a corresponding output $x_1 w_1$. In like fashion, processing element 186 produces an output $w_{n-1}x_1$ to the power of $g_{1n}$, $x_2$ to the power of $g_{2n}, \ldots, x_n$ to the power of $g_{nN}$. The outputs of processing elements 182, 184, . . . 186 are summed together by a Suitable summing means or function, such as summer 188, in an output layer to produce the output command signal y of the processor as follows:

$$y = \sum_{i=1}^{m} w_{i-1} x_1^{g_{1i}} x_2^{g_{2i}} \ldots x_n^{g_{ni}} \quad (1)$$

where m is an integer which represents the number of terms in the polynomial.

Figure 5:
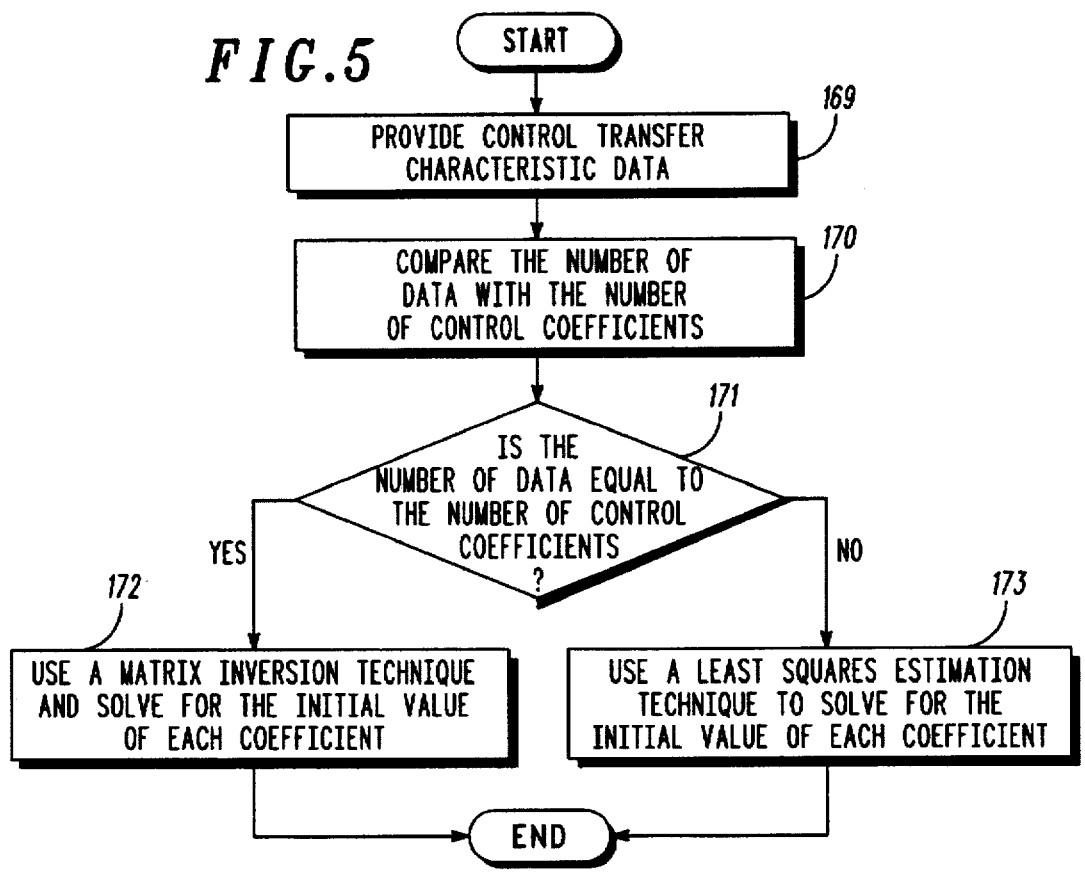
FIG. 5 shows a flow chart representation of a method of determining control coefficients for a processor in accordance with one embodiment of the present invention.

FIG. 5 shows a flow chart representation of a method of determining control coefficients for a processor in accordance with FIG. 4 in one embodiment of the present invention. First, regarding box 169, the control transfer characteristic data are provided. Next, regarding box 170, the number of data is compared with the number of control coefficients. Regarding decision box 171, if the number of data equal the number of control coefficients, the procedure goes to box 172 which indicates that a matrix inversion technique is used to solve for the initial value of each coefficient. If, on the other hand, the number of data is not equal to the number of control coefficients, the procedure goes to box 173, which indicates that a least squares estimation technique is used to solve for the initial value of each coefficient.

While a preferred embodiment is described herein, one with ordinary skill-in-the-art will recognize that other suitable estimation techniques, for example, extended least squares, pseudo inverse, Kalman filtering techniques, maximum likelihood techniques, Bayesian estimation, polynomial splines, and alike, could likewise be used to fit the control polynomial to the control transfer characteristic data.

FIG. 6 presents a flowchart representation of a method of operating the plurality of appliances in accordance with one embodiment of the present invention. The method begins by generating electrical power using a power supply as shown in step 200. The control input signal from each of the plurality of appliances are received as shown in step 202. The output command signal for each of the plurality of appliances are generated as shown in step 204. The electrical power and the output command signal are transferred to each of the plurality of appliances as shown in step 206.

FIG. 7 presents a flowchart representation of a method of operating the plurality of appliances in accordance with an alternative embodiment of the present invention. The method begins by generating electrical power using a power supply as shown in step 220. A control signal is generated for each appliance in response to an action of a user as shown in step 222. The control input signal from each of the plurality of appliances are received as shown in step 224. The output command signal for each of the plurality of appliances are generated as shown in step 226 based on the computation of a polynomial function of the control input signals, the polynomial function having a plurality of control coefficients. The electrical power and the output command signal are transferred to each of the plurality of appliances as shown in step 228.

Thus there has been described herein a concept, as well as several embodiments including a preferred embodiment, of a processor system and method for supplying electrical power and processing to a plurality of appliances.

Because the various embodiments of the present invention provide a central source for processing and electrical power to appliances, these appliances can be lighter and less costly and the processing can be performed more efficiently.

While the present invention has been described for use with home appliances, office appliances could similarly benefit from the invention. Thus, the invention described herein will likewise apply to office equipment such as word processors, copy machines, facsimile machines, telephones, printers and other computer peripheral devices.

It will be apparent to those skilled in the art that the disclosed invention may be modified in numerous ways and may assume many embodiments other than the preferred form specifically set out and described above.

Accordingly, it is intended by the appended claims to cover all modifications of the invention which fall within the true spirit and scope of the invention.

I claim:

1. In a processor system for a plurality of electrical appliances, a method of operating the electrical appliances, comprising the steps of:

receiving a plurality of control input signals from the plurality of electrical appliances;

generating an output command signal in response to the control input signals, the output control signal being generated as a nonlinear polynomial function of the control input signals, the nonlinear polynomial function including a plurality of control coefficients and a polynomial term that includes at least one of the control signals raised to a power greater than one; and transferring the output command signal to the plurality of electrical appliances over a bus.

2. The method of claim 1, further comprising the step of:
   distributing electrical power over the bus.

3. The method of claim 2 wherein the step of distributing includes:
   distributing low voltage direct current in a range from 12 to 24 volts DC.

4. The method of claim 1 further comprising the step of:
   generating the control input signal in response to an action of a user.

5. The method of claim 1, further comprising the following step:
   generating the plurality of control coefficients using a least squares method.

6. The method of claim 1, further comprising the following step:
   generating the plurality of control coefficients using a matrix inversion technique.

7. A processor system for a plurality of appliances, each of the plurality of appliances having an input unit that generates a control input signal and an output unit responsive to an output command signal, the system comprising:

a power conductor for supplying electrical power;

a bus, coupled to the plurality of appliances and the power conductor, for receiving a plurality of control input signals from the plurality of appliances, and for transferring the electrical power and the output command signal to the plurality of appliances; and a polynomial processor optimized to compute nonlinear functions and coupled to the bus, for generating the output command signal in response to the control input signals, the output control signal being generated as a nonlinear polynomial function of the control input signals, the nonlinear polynomial function having a plurality of control coefficients and a polynomial term that is based on at least one of the control input signals raised to a power greater than one.

8. The system of claim 7 wherein the electrical power includes a low voltage direct current.

9. The system of claim 8 wherein the low voltage direct current is in a range from 12 to 24 volts DC.

10. The system of claim 7 wherein the control input signal is generated in response to an action of a user.

11. The system of claim 7 wherein the system is installed in a building.

12. The system of claim 11 wherein the bus is installed within at least one wall of the building.

13. The system of claim 7 wherein the bus is coupled to a telephone line.

14. The system of claim wherein the bus is coupled to a cable television line.

15. The system of claim 7 wherein a value for each of the plurality of control coefficients is calculated using a least squares method.

16. The system of claim 7 wherein a value for each of the plurality of control coefficients is calculated using a matrix inversion technique.

17. The system of claim 7, wherein the polynomial processor comprises:

a plurality of processing elements generated a plurality of term signals, each of the term signals being based on at least one gating function of the control input signals and at least one of the term signals being based on at least one of the control signals raised to a power greater than one; and a summing circuit, operatively coupled to the processing elements, for summing the term signals to generate the output command signal.

18. A system for controlling a plurality of electrical appliances, comprising:

a power supply for supplying direct current electrical power;

a polynomial processor for generating an output command signal in response to a plurality of control input signals from the plurality of electrical appliances, the polynomial processor comprising a plurality of processing elements generating a plurality of term signals, each of the term signals being based on at least one gating function of the control input signals and at least one of the term signals being based on at least one of the control input signals raised to a power greater than one, and a summing circuit, operatively coupled to the processing elements, for summing the term signals to generate the output command signal; and a bus, operatively coupled to the power supply, the electrical appliances and the polynomial processor, for transferring direct current electrical power and the output command signal to the plurality of electrical appliances, and for transferring the control input signals to the polynomial processor.

19. The system of claim 18 wherein the direct current electrical power is in a range from 12 to 24 volts DC.

20. The system of claim 18 wherein the input command signals are generated in response to an action of a user.

21. The system of claim 18 wherein the system is installed in a building.

22. The system of claim 21 wherein the bus is installed within at least one wall of the building.

23. The system of claim 18 wherein the bus is coupled to a telephone line.

24. The system of claim 18 wherein the bus is coupled to a cable television line.

* * * * *

UNITED STATES PATENT AND TRADEMARK OFFICE
CERTIFICATE OF CORRECTION

PATENT NO. : 5,710,712
DATED      : Jan. 20, 1998
INVENTOR(S) : Labun

It is certified that error appears in the above-indentified patent and that said Letters Patent is hereby corrected as shown below:

Column 6, line 28: after "claim" insert --7--

Signed and Sealed this

Twenty-eighth Day of September, 1999

Attest:

Q. TODD DICKINSON

*Attesting Officer*      *Acting Commissioner of Patents and Trademarks*